United States Patent [19]
Klein et al.

[11] 3,924,842

[45] Dec. 9, 1975

[54] APPARATUS FOR PREPARING A PLASTICATED MATERIAL

[75] Inventors: Imrich Klein, Highland Park, N.J.; Zehev Tadmor, Haifa, Israel

[73] Assignee: Scientific Process & Research, Inc., Highland Park, N.J.

[22] Filed: Apr. 11, 1974

[21] Appl. No.: 460,046

[52] U.S. Cl. .............................................. 259/192
[51] Int. Cl.² ........................................ B29B 1/06
[58] Field of Search ............ 259/191, 192, 193, 97, 259/9, 10, 8, 105; 425/207, 208, 209; 100/145, 146, 148

[56] References Cited
UNITED STATES PATENTS

| | | | |
|---|---|---|---|
| 3,689,182 | 9/1972 | Kovacs | 259/191 |
| 3,712,594 | 1/1973 | Schippers | 259/191 |
| 3,746,318 | 7/1973 | Schippers | 259/191 |

*Primary Examiner*—Robert W. Jenkins
*Attorney, Agent, or Firm*—Samuelson & Jacob

[57] ABSTRACT

Apparatus for preparing a plasticated material from solids introduced into the apparatus, the apparatus including a barrel having a screw conveyor therein defining a channel for conveying the material downstream as the material is melted within the channel and a passage communicating with the channel at a downstream location and an upstream location, the locations being chosen such that unmelted solids enter the passage at the downstream location and are carried through the passage in an upstream direction, bypassing the channel, to be reintroduced into the channel at the upstream location.

26 Claims, 7 Drawing Figures

APPARATUS FOR PREPARING A PLASTICATED MATERIAL

The present invention relates generally to plasticating apparatus and pertains, more specifically, to apparatus for obtaining improved melting of solids introduced into plasticating extruders.

Conventional plasticating extruders include a melting zone in the channel within which material to be plasticated is carried, the material in the melting zone being in the form of a solid bed and a melt pool. As melting progresses within the melting zone, the width of the solid bed decreases while the width of the melt pool increases. Because melting takes place at the area of contact between the solid bed and the barrel of the extruder, melting is made more efficient by increasing the contact area between the solid bed and the barrel to increase the amount of heat conducted through the barrel and increase the viscous heat dissipation in the melt film which lies between the solid bed and the barrel. Such an increase in contact area is effected by constructing the extruder screw conveyor channel in three geometrical sections from the inlet end of the barrel to the outlet end; namely, a deep section of constant depth, a compression section downstream of the deep section and having a decreasing depth, and a shallow section of constant depth downstream of the compression section. Since the depth of the channel decreases along the compression section, the width of the solid bed is able to decrease at a slower rate than if the channel depth remains constant.

However, in conventional extruder screws, the width of the solid bed in the compression section can decrease at a slower rate than the decrease in the channel cross-section. As a result, there is a tendency for the solid bed to at least partially, and sometimes entirely, plug the channel, thus preventing the melt formed upstream of the solid plug from reaching the discharge end of the extruder and thereby decreasing the output of the extruder. Such a phenomenon occasionally results in cyclic variations of output production, known as "surging." Surging is undesirable and is ordinarily avoided by operating the equipment under conditions where the rate of production is lowered considerably.

It is an object of the invention to provide an arrangement which improves melting of material within a plasticating apparatus so as to enable an increased rate of output production.

Another object of the invention is to provide a plasticating apparatus in which the quality of the extrudate is improved, along with an increase in the rate of production of extrudate.

A further object of the invention is to provide plasticating apparatus which enables increased control over the rate of production of extrudate with a lessened tendency toward surging, together with greater control over extrudate quality.

A still further object of the invention is to provide plasticating apparatus as described above and which is relatively simple in construction and use.

The above objects, as well as still further objects and advantages, are attained by the invention which may be described briefly as apparatus for preparing a plasticated material from solids introduced into the apparatus, the apparatus comprising a barrel, a screw conveyor in the barrel defining a channel for conveying the material in a downstream direction as the material is melted within the channel, and a passage communicating with the channel at a downstream location and an upstream location and bypassing the channel between those locations, the locations each being positioned such that unmelted solids will enter the passage at the downstream location, be carried through the passage in an upstream direction, and be reintroduced into the channel at the upstream location.

The invention will be more fully understood, while still further objects and advantages thereof will become apparent, in the following detailed description of preferred embodiments of the invention illustrated in the accompanying drawing, in which.

Figure 1:
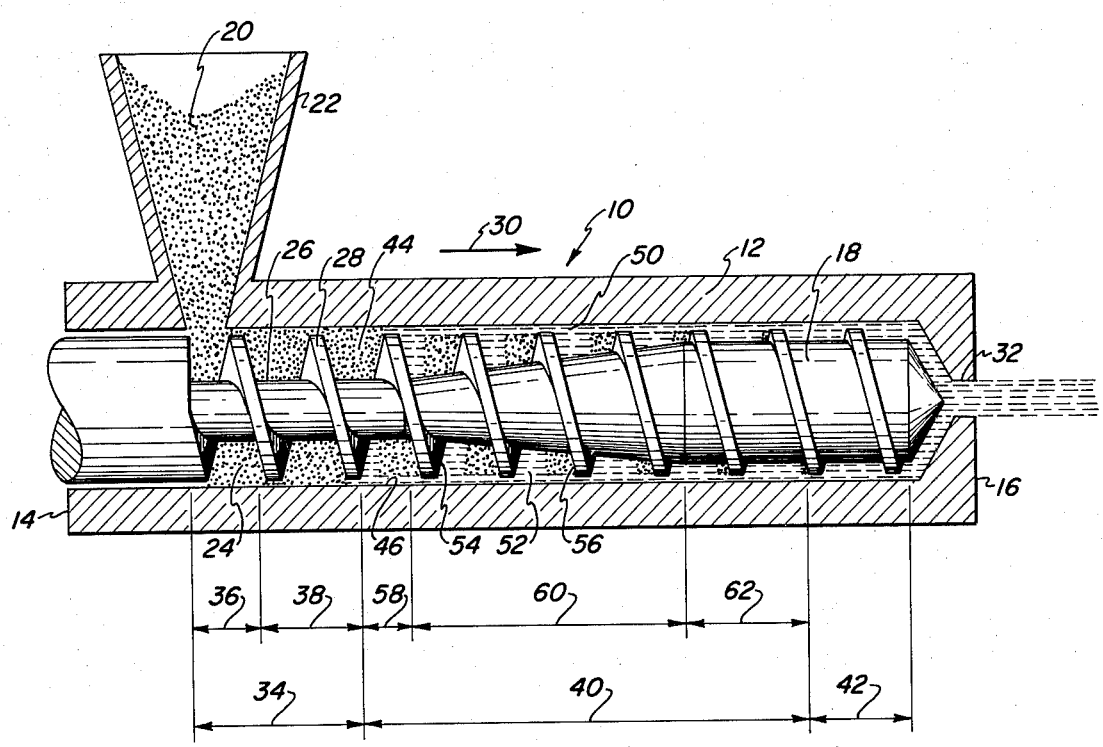
FIG. 1 is a schematic representation of a typical plasticating extruder now in common use.
Figure 2:
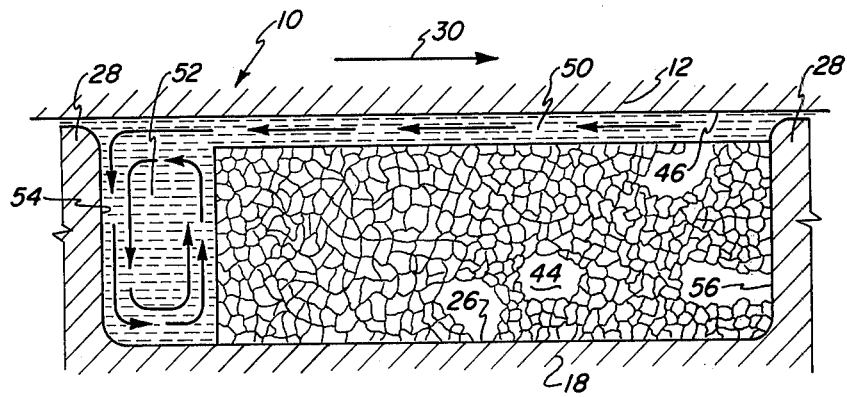
FIG. 2 is an enlarged, cross-channel, cross-sectional view of a portion of the channel in the extruder of FIG. 1.

Referring now to the drawing, and especially to FIGS. 1 and 2 thereof, a plasticating extruder of the type now in common use is illustrated schematically at 10 and is seen to include a barrel 12 extending axially between an upstream end 14 and a downstream end 16, and a screw conveyor 18 in the barrel. The purpose of the illustrated arrangement is to melt, or plasticate, a solid material, or a molten material having a high viscosity at room temperature, and to deliver, or pump, the plasticated material to a further apparatus, such as molding machine, a die or the like. It will be understood that the terms "solids" or "solid material", as employed herein, include highly viscous materials which behave similar to solids in the described apparatus, as well as actual solid materials. A reservoir of solid material 20 is held in a hopper 22 which communicates with the inner chamber 24 of the barrel 12 adjacent the upstream end 14 and feeds the solid material 20 into a channel 26 defined by a helical flight 28 on the screw conveyor 18. Rotation of the screw conveyor 18 within the barrel 12 will advance the material 20 along the channel 26 in a downstream direction 30 until the material is delivered, in melted form, to a discharge point 32 at the downstream end 16 of the barrel.

Extruder 10 may be divided into several functional zones; namely, a solids conveying zone 34, which includes a hopper zone 36 and a delay zone 38, a melting zone 40, and a melt conveying zone 42.

The hopper 22 serves as a reservoir for the solid material 20 and ensures that solids are continuously supplied to the extruder. The solids enter the solids conveying zone 34 at the hopper zone 36 and are conveyed by the screw conveyor 18 to the delay zone 38. The solids conveying zone 34 occupies a portion of the channel 26 where no melting of the solid material 20 takes place. The length of the solids conveying zone 34 is roughly defined by the length of the unheated portion of the barrel 12 in the vicinity of the hopper 22. The function of zone 34 is to compact the solids in the channel into a solid bed 44.

The delay zone 38 starts at the point where the inner surface 46 of the barrel 12 reaches the melting point of the material 20, either as a result of heat conducted through a heated barrel, or because of frictional heat generated by the solid bed 44 rubbing against the barrel. The melt generated at the inner surface 46 of the barrel 12 forms a continuous film 50, provided that the solid bed 44 is sufficiently compacted. Compacting of the solid bed 44 depends upon the effectiveness of the solids conveying zone 34. Over the whole length of the delay zone 38, melt appears only in the film 50 between the solid bed 44 and the inner surface 46 of the barrel 12.

The melting zone 40 begins at the point where the delay zone 38 ends and where a melt pool 52 starts to form, cross-channel between the leading face 54 of the flight 28, which faces downstream, and the confronting trailing face 56 of the flight 28, which faces upstream. Referring now to FIG. 2, as well as to FIG. 1, the melt pool 52 is juxtaposed with the leading face 54 of the flight 28 and gradually replaces the progressively melting solid bed 44 throughout the length of the melting zone 40. The melting zone 40 usually occupies the major portion of the length of the extruder 10.

The melt conveying zone 42 is the last functional zone of the extruder 10 and identifies the portion of the extruder where no unmelted solids remain. In zone 42, melted material is pumped to the discharge point 32 at end 16 of the barrel.

As illustrated in more detail in FIG. 2, the melt film 50, which is generated at the inner surface 46 of the barrel 12, is continuously fed from the solid bed 44 and, as the volume of the solid bed decreases, the volume of the melt increases, the melt spills into the low shear melt pool 52. As the melting process continues, the melt pool 52 grows in volume while the solid bed 44 decreases in volume.

In order to increase the efficiency of melting in the melting zone, melting zone 40 itself is divided into three geometrical sections; namely, a relatively deep section 58, of essentially constant depth, a compression section 60 downstream of the deep section 58 and having a depth which decreases in the downstream direction, and a relatively shallow section 62 of essentially constant depth downstream of the compression section 60. Since the depth of channel 26 decreases along the compression section 60, the width of the solid bed 44 is able to decrease at a slower rate than if the channel depth were to remain constant. Hence, the area of contact between the solid bed 44 and the inner surface 46 of the barrel 12 is maintained greater than if the channel depth remained constant, thus increasing the amount of heat conducted through the barrel to the solid bed and increasing the viscous heat dissipation in the melt film 50.

However, in some instances, the width of the solid bed 44 in the compression section 60 can decrease at such a slower rate that there is a tendency for the solid bed 44 to at least partially, and sometimes entirely, plug the channel, thus preventing the melted material formed upstream of the solid plug from reaching the discharge point 32 of the extruder. The output volume or production rate of the extruder is thereby decreased. Such a phenomenon can manifest itself in cyclic variations of output production, known as "surging." In order to avoid surging, the extruder is operated at a lowered rate of production.

Figure 3:
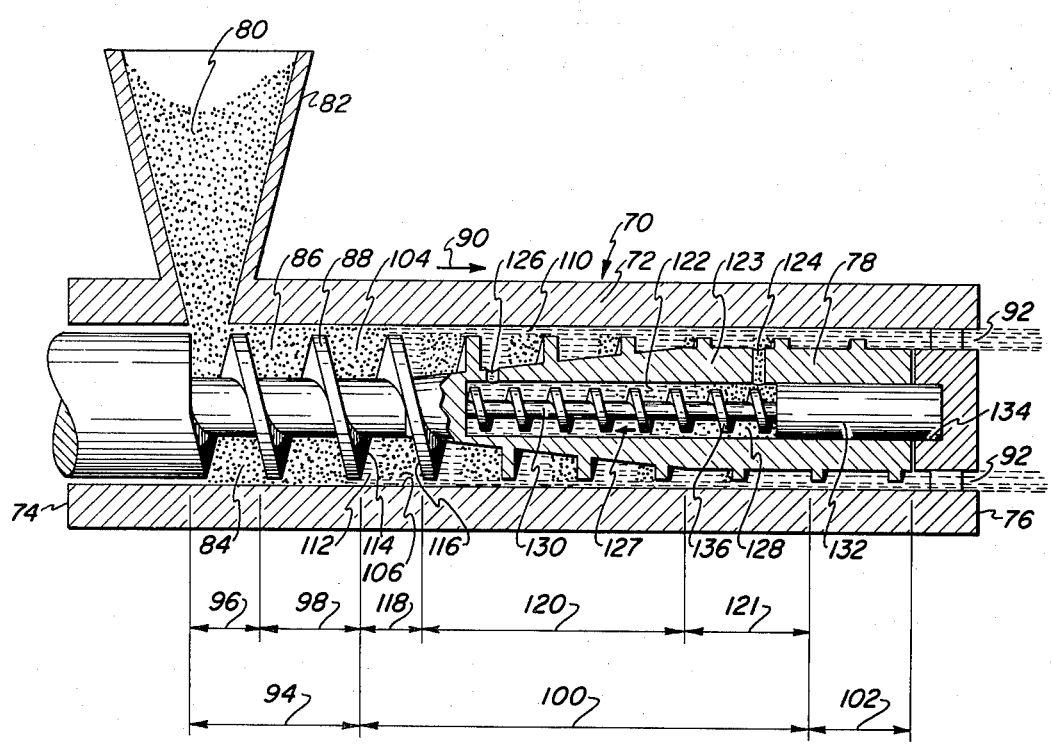
FIG. 3 is a schematic representation of a plasticating extruder constructed in accordance with the invention.
Figure 4:
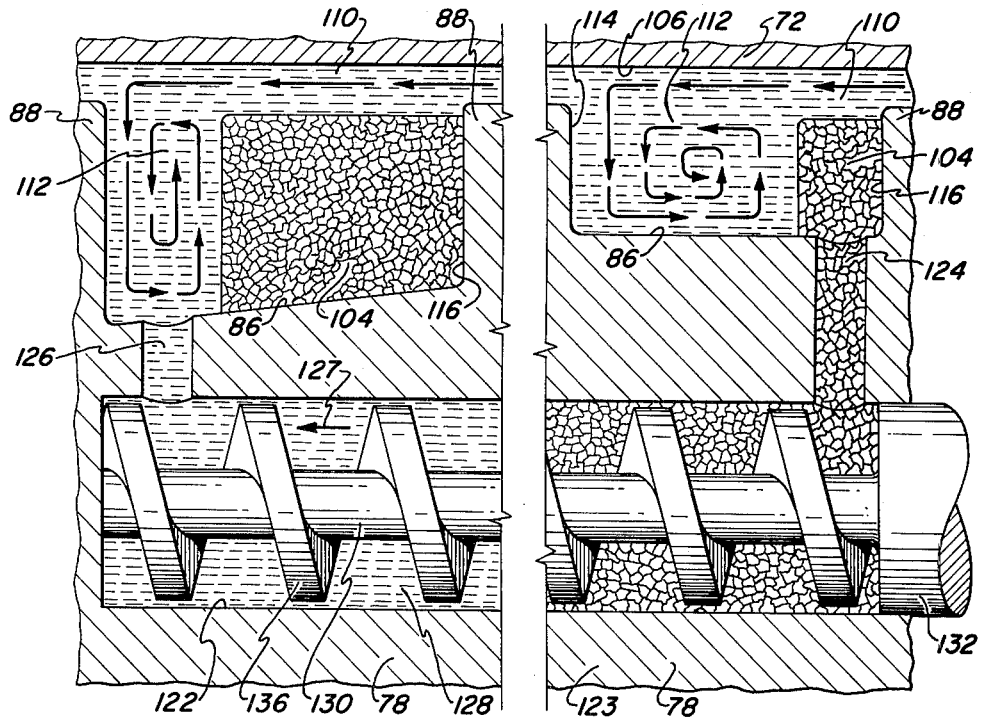
FIG. 4 is an enlarged, cross-channel, cross-sectional view of portions of the channel in the extruder of FIG. 3.

Turning now to FIGS. 3 and 4, a plasticating extruder constructed in accordance with the invention is illustrated schematically at 70. Extruder 70 is similar in construction to extruder 10 insofar as extruder 70 includes a barrel 72 extending axially between an upstream end 74 and a downstream end 76, and a screw conveyor 78 in the barrel. A reservoir of solid material 80 is held in a hopper 82 which communicates with the inner chamber 84 of the barrel 72 adjacent the upstream end 74 and feeds the solid material 80 into a channel 86 defined by a helical flight 88 on the screw conveyor 78. Rotation of the screw conveyor 78 within the barrel 72 will advance the material 80 along the channel 86 in a downstream direction 90 until the material is delivered, in melted form, to a discharge point 92 at the downstream end 76 of the barrel.

Extruder 70 is also divided into functional zones; namely, a solids conveying zone 94, which includes a hopper zone 96 and a delay zone 98, a melting zone 100, and a melt conveying zone 102. The solids are compacted into a solid bed 104 and, where the inner surface 106 of the barrel 72 reaches the melting point of material 80, the resulting melt forms a continuous film 110.

In the melting zone 100, a melt pool 112 begins to form, cross-channel between the leading face 114 of flight 88, which faces downstream, and the confronting trailing face 116 of flight 88, which faces upstream. Referring to FIG. 4, as well as to FIG. 3, the melt pool 112 is juxtaposed with the leading face 114 of flight 88 and gradually replaces the progressively melting solid bed 104 along the melting zone 100. As illustrated in more detail in FIG. 4, the melt film 110 is continuously fed from the solid bed 104 and, as the volume of the solid bed decreases, and the volume of the melt increases, the melt spills into the low shear melt pool 112.

Melting zone 100 itself is divided into three geometrical sections; namely, a relatively deep section 118, of essentially constant depth, a compression section 120 downstream of the deep section 118 and having a depth which decreases in the downstream direction, and a relatively shallow section 121 of essentially constant depth downstream of the compression section 120. As explained above, in some instances the width of the solid bed in the compression section can decrease at a slower rate than the decrease in channel cross-section provided in the compression section. As a result, there is a tendency for the solid bed to at least partially, and sometimes entirely, plug the channel, thus preventing the melted material formed upstream of the solid plug from reaching the discharge point 92 of the extruder. In order to preclude such plugging of the channel 86, extruder 70 is provided with means for draining unmelted material from a downstream location in the channel 86 and passing the drained material upstream, bypassing the channel, to be reintroduced into the channel at an upstream location, the downstream and upstream locations being positioned so that such recycling of the solid materials will prevent the formation of a plug which could cause deleterious blockage of the channel. Thus, extruder 70 has a passage 122, in this instance extending through the interior of the arbor 123 of screw conveyor 78. Passage 122 communicates with channel 86 at a downstream location at an opening 124 and at an upstream location at an opening 126. Opening 124 is positioned with respect to the channel 86 such that unmelted solids will enter the passage 122 and will travel in an upstream direction 127. The opening 126 is positioned with respect to the channel 86 such that the drained material 128 passing through the passage 122 will be reintroduced into the channel upstream of any potential blockage. Opening 124 is located adjacent to and preferably immediately behind trailing face 116 of flight 88 to assure that unmelted solids will pass through opening 124. Opening 126 is located adjacent to and preferably immediately ahead of leading face 114 of flight 88 so that the drained material 128 which passes through passage 122 re-enters channel 86 at a location where there is likely to be melted material. At least part of the drained material 128 ordinarily will be melted as it travels along passage 122 so that the drained material will be reintroduced into channel 86 in at least partially melted form. Thus, melting efficiency is increased and the quality of the extrudate is enhanced. More than one opening 124 may be provided at the downstream location and, likewise, a plurality of openings 126 may be provided at the upstream location. The passage 122 preferably extends along the central longitudinal axis of the screw conveyor 78 and each opening 124 and 126 extends laterally through the screw conveyor 78, in a radial direction, from the channel 86 to the interior passage 122.

In order to facilitate movement of the drained material 128 in the upstream direction and thereby attain the desired effectiveness of interior passage 122, a second or inner screw conveyor is inserted into passage 122, as shown at 130. Inner screw conveyor 130 extends axially along interior passage 122 and has an arbor 132 which is affixed to barrel 72 at 134. A flight 136 extends along the length of the inner screw conveyor 130 within the passage 122. Since the inner screw conveyor 130 is fixed to the barrel 72, it remains stationary relative to the rotating outer screw conveyor 78. Hence, flight 136 is "flighted" in the same direction as flight 88 of screw conveyor 78; that is, the helix followed by flight 136 extends in the same direction as the helix of flight 88. In this manner, flight 136 exerts a force upon the drained material 128 in the upstream direction 127 from opening 124 toward opening 126.

Figure 5:
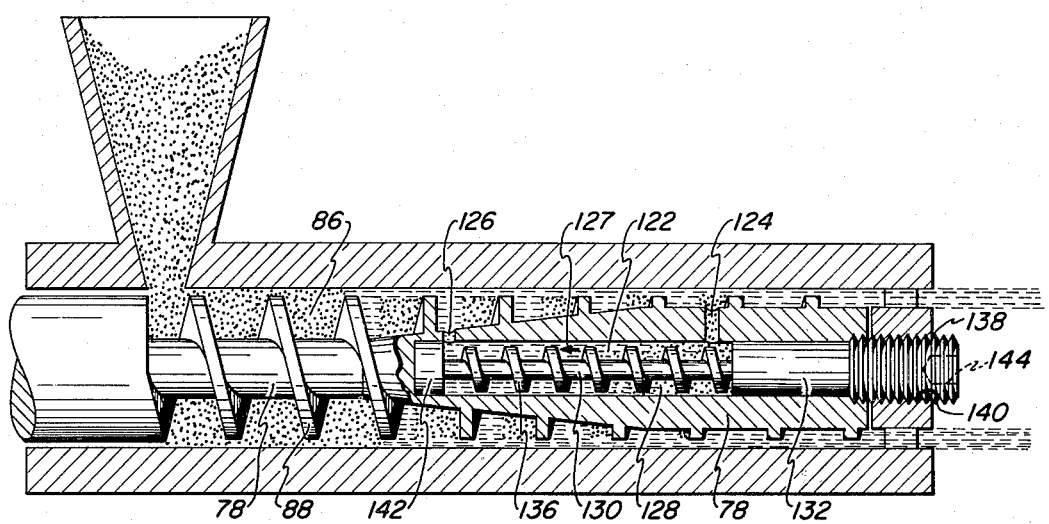
FIG. 5 is a schematic representation of an adjusting means employed in an extruder otherwise constructed in accordance with the embodiment of FIG. 3.

A positive control over the amount of material permitted to pass through passage 122, when the passage is provided with an inner screw conveyor 130, may be provided by enabling longitudinal adjustment of the inner screw conveyor 130 relative to the outer screw conveyor 78, as illustrated in FIG. 5. Thus, the arbor 132 of the inner screw conveyor 130 can be provided with a threaded extension 138 at one end thereof which engages a complementary threaded aperture 140 in the barrel 72 of the extruder. A valve shoulder 142 is integral with the opposite end of the inner screw conveyor 130 adjacent opening 126 in the outer screw conveyor 78. Selective rotation of the inner screw conveyor 130 within the threaded aperture 140, as by engagement of a hexagonal socket 144 with an appropriate tool, will advance or retract the shoulder 142 relative to opening 126, thereby enabling partial closing of opening 126 and regulation of the volume of drained material. Alternately, a shoulder similar to shoulder 142 can be provided adjacent opening 124 to attain the desired regulation.

Figure 6:
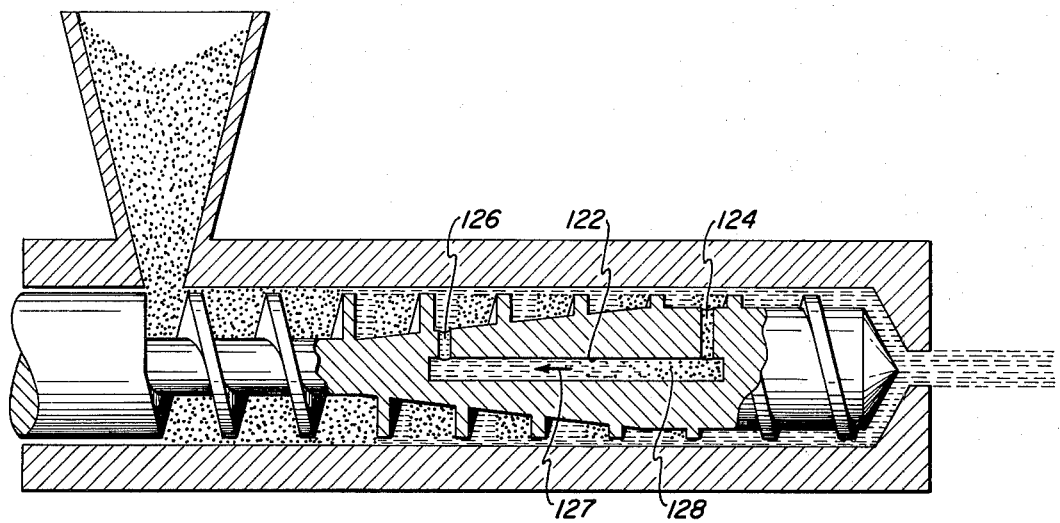
FIG. 6 is a schematic representation of another plasticating extruder constructed in accordance with the invention.
Figure 7:
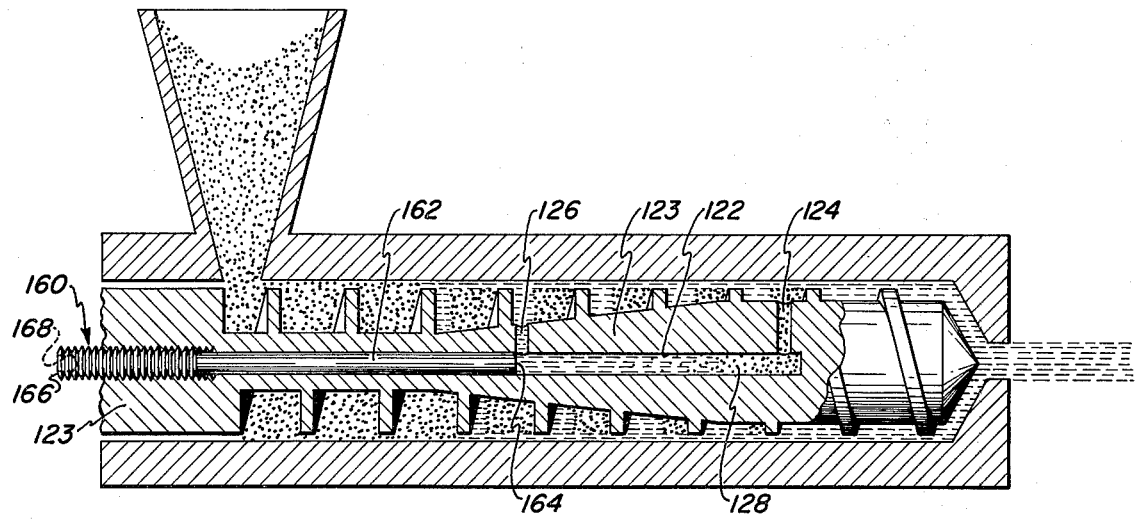
FIG. 7 is a schematic representation of an adjusting means employed in an extruder otherwise constructed in accordance with the embodiment of FIG. 6.

In another embodiment of the invention illustrated in FIGS. 6 and 7, the inner screw conveyor 130, which appears in the embodiment of FIGS. 3 through 5, is eliminated and movement of the drained material 128 in the upstream direction within passage 122 is accomplished as a result of pressure differences between openings 124 and 126 which drive the drained material in the direction 127 from opening 124 toward opening 126. Thus, the construction of the embodiment of FIGS. 6 and 7 is somewhat simpler than that of the earlier-described embodiment of FIGS. 3 through 5.

As seen in FIG. 7, a positive control over the amount of material 128 permitted to pass through passage 122 may be provided by the insertion of control means shown in the form of control valve 160. Control valve 160 includes a valve rod 162 threaded into the screw conveyor arbor 123 and extending axially to an end 164 adjacent opening 126. Valve rod 162 may be rotated selectively relative to arbor 123 to locate end 164 at a selected position relative to opening 126, thereby enabling partial closing of opening 126 and regulation of the flow of material through the opening. Adjustment of the control valve 160 can be accomplished from outside the extruder 70 merely by rotating the external end 166 of the valve rod 162. In this instance, end 166 is provided with a hexagonal socket 168 which can be engaged by a suitable tool for rotational adjustment. Thus, control valve 160 is adjusted readily to accommodate a variety of materials and operating conditions. Alternately, a control valve may be provided in the same manner at the opening 124, rather than at opening 126, to enable partial closing of opening 124 and concomitant regulation of the flow of drained material.

It is to be understood that the above detailed description of preferred embodiments is provided by way of example only. Various details of design and construction may be modified without departing from the true spirit and scope of the invention as set forth in the appended claims.

The embodiments of the invention in which an exclusive property or privilege is claimed are defined as follows:

1. Apparatus for preparing a plasticated material from solids introduced into the apparatus, said apparatus comprising:

a barrel;

a first screw conveyor in the barrel, said screw conveyor including a flight defining a channel for conveying the material in a downstream direction as the material is melted within the channel, said flight having a leading face facing downstream and a trailing face facing upstream, said channel extending between the leading face and the trailing face;

a passage communicating with the channel at a downstream location and an upstream location and bypassing the channel between said locations, the locations each being positioned such that the downstream location is adjacent the trailing face of the flight to enable unmelted solids to enter the passage at the downstream location, be carried through the passage in an upstream direction, and be reintroduced into the channel at the upstream location; and a second screw conveyor in said passage arranged to convey material from the downstream location to the upstream location.

2. The invention of claim 1 wherein
   the upstream location is adjacent the leading face of the flight.

3. The invention of claim 2 including selectively adjustable means for selectively adjusting the amount of unmelted solids which will enter the passage.

4. The invention of claim 2 wherein said passage extends along the interior of the screw conveyor.

5. The invention of claim 4 wherein said second screw conveyor includes a second flight defining a second channel within the first said screw conveyor.

6. The invention of claim 5 wherein the second screw conveyor is fixed relative to the barrel and remains stationary relative thereto, said first and second screw conveyors both being flighted in the same direction.

7. The invention of claim 6 including selectively adjustable means for selectively adjusting the amount of unmelted solids which will enter the passage.

8. Apparatus for preparing a plasticated material from solids introduced into the apparatus, said apparatus comprising:
- a barrel;
- a first screw conveyor in the barrel defining a channel for conveying the material in a downstream direction as the material is melted within the channel;
- a passage communicating with the channel at a downstream location and an upstream location and bypassing the channel between said locations, the locations each being positioned such that unmelted solids will enter the passage at the downstream location, be carried through the passage in an upstream direction, and be reintroduced into the channel at the upstream location;
- a second screw conveyor in said passage arranged to convey material from the downstream location to the upstream location; and
- selectively adjustable means for selectively adjusting the amount of unmelted solids which will enter the passage.

9. Apparatus for preparing a plasticated material from solids introduced into the apparatus, said apparatus comprising:
- a barrel extending axially between an upstream end and a downstream end;
- a first screw conveyor in the barrel;
- a flight on the screw conveyor for conveying material axially downstream along the barrel, said flight having a leading face facing downstream and a trailing face facing upstream;
- said flight defining a channel extending between the leading face and the trailing face, through which channel said material will pass as the material is conveyed downstream;
- said channel including a melting zone having a relatively deep section of essentially constant depth, a compression section downstream of the deep section and having a decreasing depth in the downstream direction, and a relatively shallow section of essentially constant depth downstream of the compression section;
- a first opening located adjacent the trailing face of the flight and communicating with the channel adjacent the downstream end of the melting zone the location of said first opening being such that unmelted solids will enter the opening;
- a second opening communicating with the channel adjacent the upstream end of the melting zone;
- a passage bypassing said channel between the first opening and the second opening for conveying said unmelted solids in the upstream direction from the first opening to the second opening; and
- a second screw conveyor in said passage arranged to convey material from said first opening to said second opening.

10. The invention of claim 9 wherein the second opening is adjacent the leading face of the flight.

11. The invention of claim 10 including selectively adjustable means for selectively adjusting the effective size of at least one of said first and second openings to thereby regulate the amount of solids conveyed through said passage.

12. The invention of claim 10 wherein said passage extends axially along the interior of the screw conveyor and the openings extend generally radially outwardly from the passage to the channel.

13. The invention of claim 12 wherein said second screw conveyor includes a second flight defining a second channel within the first said screw conveyor, said first and second openings communicating with said second channel.

14. The invention of claim 13 wherein said second screw conveyor is affixed to the barrel and remains stationary relative thereto, said first and second screw conveyors both being flighted in the same direction.

15. The invention of claim 14 including selectively adjustable means for selectively adjusting the effective size of at least one of said first and second openings to thereby regulate the amount of solids conveyed through said passage.

16. Apparatus for preparing a plasticated material from solids introduced into the apparatus, said apparatus comprising:
- a barrel extending axially between an upstream end and a downstream end;
- a first screw conveyor in the barrel;
- a flight on the screw conveyor for conveying material axially downstream along the barrel, said flight having a leading face facing downstream and a trailing face facing upstream;
- said flight defining a channel extending between the leading face and the trailing face, through which channel said material will pass as the material is conveyed downstream;
- said channel including a melting zone having a relatively deep section of essentially constant depth, a compression section downstream of the deep section and having a decreasing depth in the downstream direction, and a relatively shallow section of essentially constant depth downstream of the compression section;
- a first opening communicating with the channel adjacent the downstream end of the melting zone;
- a second opening communicating with the channel adjacent the upstream end of the melting zone;
- a passage bypassing said channel between the first opening and the second opening for conveying solids in the upstream direction from the first opening to the second opening;
- a second screw conveyor in said passage arranged to convey material from said first opening to said second opening; and
- selectively adjustable means for selectively adjusting the effective size of at least one of said first and second openings to thereby regulate the amount of solids conveyed through said passage.

17. Apparatus for preparing a plasticated material from solids introduced into the apparatus, said apparatus comprising:
- a barrel;

a screw conveyor in the barrel, said screw conveyor including a flight defining a channel for conveying the material in a downstream direction as the material is melted within the channel, said flight having a leading face facing downstream and a trailing face facing upstream, said channel extending between the leading face and the trailing face; and a passage communicating with the channel at a downstream location and an upstream location and bypassing the channel between said locations, the locations each being positioned such that the downstream location is adjacent the trailing face of the flight to enable unmelted solids to enter the passage at the downstream location, be carried through the passage in an upstream direction, and be reintroduced into the channel at the upstream location.

18. The invention of claim 17 wherein the upstream location is adjacent the leading face of the flight.

19. The invention of claim 18 including selectivly adjustable means for selectively adjusting the amount of unmelted solids which will enter the passage.

20. The invention of claim 18 wherein said passage extends along the interior of the screw conveyor.

21. Apparatus for preparing a plasticated material from solids introduced into the apparatus, said apparatus comprising:
a barrel;
a screw conveyor in the barrel defining a channel for conveying the material in a downstream direction as the material is melted within the channel;
a passage communicating with the channel at a downstream location and an upstream location and bypassing the channel between said locations, the locations each being positioned such that unmelted solids will enter the passage at the downstream location, be carried through the passage in an upstream direction, and be reintroduced into the channel at the upstream location; and
selectively adjustable means for selectively adjusting the amount of unmelted solids which will enter the passage.

22. Apparatus for preparing a plasticated material from solids introduced into the apparatus, said apparatus comprising:
a barrel extending axially between an upstream end and a downstream end;
a screw conveyor in the barrel;
a flight on the screw conveyor for conveying material axially downstream along the barrel, said flight having a leading face facing downstream and a trailing face facing upstream;
said flight defining a channel extending between the leading face and the trailing face, through which channel said material will pass as the material is conveyed downstream;
said channel including a melting zone having a relatively deep section of essentially constant depth, a compression section downstream of the deep section and having a decreasing depth in the downstream direction, and a relatively shallow section of essentially constant depth downstream of the compression section;
a first opening located adjacent the trailing face of the flight and communicating with the channel adjacent the downstream end of the melting zone the location of said first opening being such that unmelted solids will enter the opening;
a second opening communicating with the channel adjacent the upstream end of the melting zone; and
a passage bypassing said channel between the first opening and the second opening for conveying said unmelted solids in the upstream direction from the first opening to the second opening.

23. The invention of claim 22 wherein the second opening is adjacent the leading face of the flight.

24. The invention of claim 23 including selectively adjustable means for selectively adjusting the effective size of at least one of said first and second openings to thereby regulate the amount of solids conveyed through said passage.

25. The invention of claim 23 wherein said passage extends axially along the interior of the screw conveyor and the openings extend generally radially outwardly from the passage to the channel.

26. Apparatus for preparing a plasticated material from solids introduced into the apparatus, said apparatus comprising:
a barrel extending axially between an upstream end and a downstream end;
a screw conveyor in the barrel;
a flight on the screw conveyor for conveying material axially downstream along the barrel, said flight having a leading face facing downstream and a trailing face facing upstream;
said flight defining a channel extending between the leading face and the trailing face, through which channel said material will pass as the material is conveyed downstream;
said channel including a melting zone having a relatively deep section of essentially constant depth, a compression section downstream of the deep section and having a decreasing depth in the downstream direction, and a relatively shallow section of essentially constant depth downstream of the compression section;
a first opening communicating with the channel adjacent the downstream end of the melting zone;
a second opening communicating with the channel adjacent the upstream end of the melting zone;
a passage bypassing said channel between the first opening and the second opening for conveying solids in the upstream direction from the first opening to the second opening; and
selectively adjustable means for selectively adjusting the effective size of at least one of said first and second openings to thereby regulate the amount of solids conveyed through said passage.

* * * * *